(12) United States Patent
Ida et al.

(10) Patent No.: US 7,715,423 B2
(45) Date of Patent: May 11, 2010

(54) COMMUNICATION TERMINAL DEVICE AND COMMUNICATION METHOD

(75) Inventors: Kentaro Ida, Tokyo (JP); Yomei Otani, Tokyo (JP)

(73) Assignee: Sony Corporation, Tokyo (JP)

( * ) Notice: Subject to any disclaimer, the term of this patent is extended or adjusted under 35 U.S.C. 154(b) by 904 days.

(21) Appl. No.: 11/231,964

(22) Filed: Sep. 22, 2005

(65) Prior Publication Data

US 2006/0072475 A1   Apr. 6, 2006

(30) Foreign Application Priority Data

Sep. 30, 2004   (JP)   ............................. 2004-287850
Oct. 4, 2004   (JP)   ............................. 2004-292022

(51) Int. Cl.
*H04J 3/26*   (2006.01)
(52) U.S. Cl. .................. 370/432; 709/230; 370/475
(58) Field of Classification Search .............. 370/254, 370/489; 709/230
See application file for complete search history.

(56) References Cited

U.S. PATENT DOCUMENTS

2003/0202539 A1 * 10/2003 Fukunaga et al. ........... 370/489

FOREIGN PATENT DOCUMENTS

| JP | 06-303279 | 1/1994 |
|---|---|---|
| JP | 2000-312215 | 11/2000 |
| JP | 2000-312236 | 11/2000 |
| JP | 2002-073564 | 3/2002 |
| JP | 2002-281166 | 9/2002 |
| JP | 2003-333071 | 11/2003 |

* cited by examiner

*Primary Examiner*—Seema S Rao
*Assistant Examiner*—Wanda Z Russell
(74) *Attorney, Agent, or Firm*—Finnegan, Henderson, Farabow, Garrett and Dunner, L.L.P.

(57) ABSTRACT

A communication terminal device performs communication based on a communication protocol defined so that first identification information assigned to the device is transmitted to and received from a communication party. The device includes an identification information generating section for detecting, based on information unique to the device, second identification information different from the first identification information, a storage section for storing a table representing a correspondence between the generated second identification information and the type of the device, and a control section for controlling the storage section so that communication with the communication party is established based on the table. The control section transmits the second identification information and type of the device to unspecified destinations with predetermined timing, and updates the table based on second identification information and type of the communication party which are sent back as a response from the communication party.

9 Claims, 13 Drawing Sheets

CHANGE OF NETWORK SETTING

FIG. 9
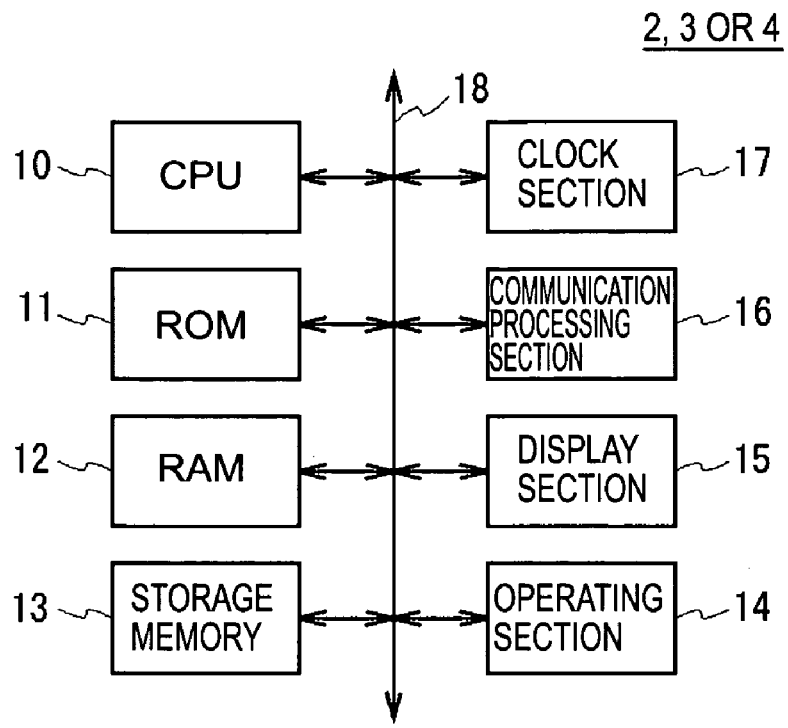
FIG. 10
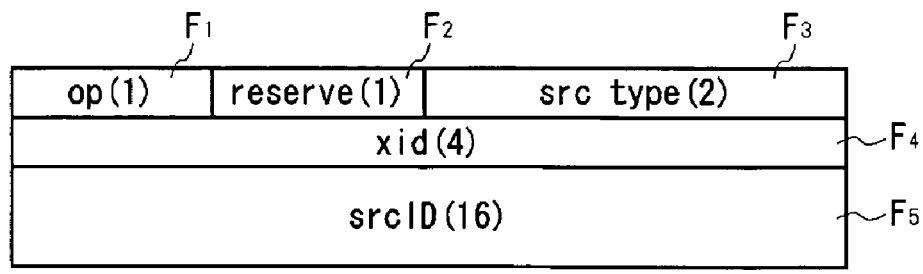
FIG. 11
| op | 1 : B_QUERY | 2 : B_RESPONSE |
|---|---|---|
|  | 3 : COMMAND | 4 : ACK |
|  | 5 : NAK | 6 : B_COMMAND |
|  | 7 : B_ACK | 8 : B_NAK |

FIG. 12
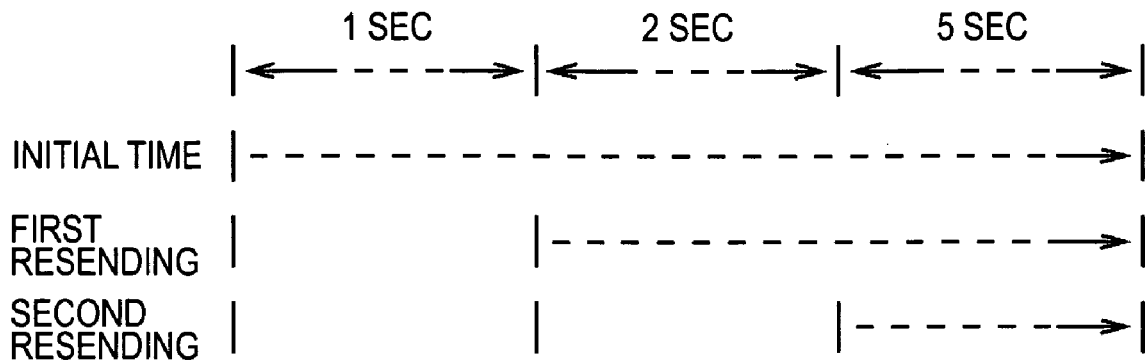
FIG. 13
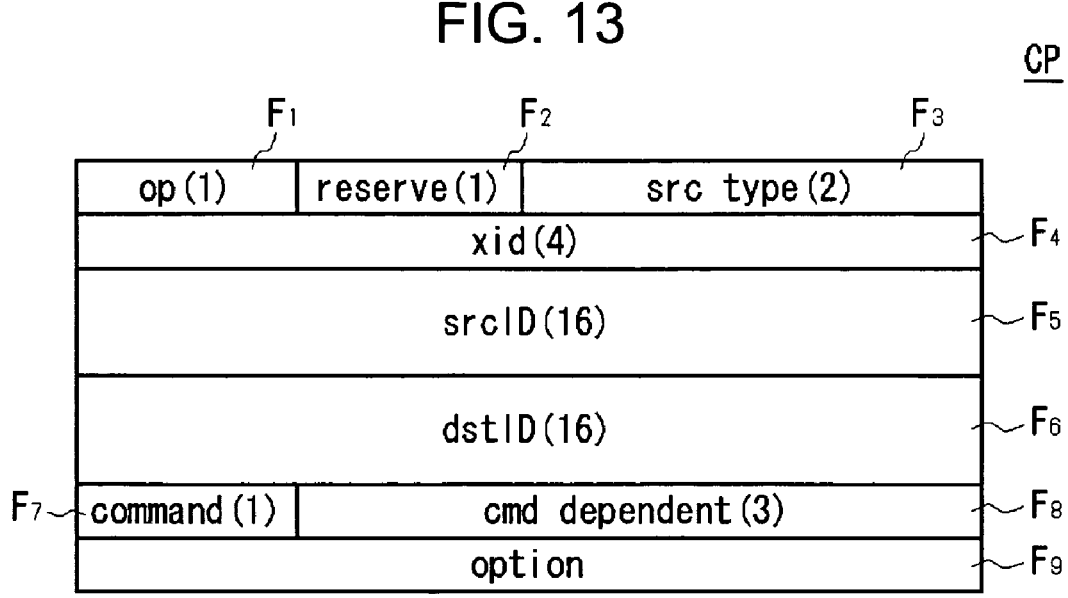
FIG. 14
| op | 1 | COMMAND (=3) |
|---|---|---|
| reserve | 1 | RESERVED FIELD |
| src type | 2 | "TYPE OF HARDWARE" |
| xid | 4 | "TRANSACTION ID" |
| srcID | 16 | "TRANSMITTER ID" |
| dstID | 16 | "RECEIVER ID" |
| command | 1 | ChangeState (=1) |
| state flag | 1 | 3:Standly  5:off  7:reboot |

COMMUNICATION TERMINAL DEVICE AND COMMUNICATION METHOD

CROSS REFERENCES TO RELATED APPLICATIONS

The present invention contains subject matter related to Japanese Patent Application JP 2004-287850 filed in the Japanese Patent Office on Sep. 30, 2004 and Japanese Patent Application JP 2004-292022 filed in the Japanese Patent Office on Oct. 4, 2004, the entire contents of which are incorporated herein by reference.

BACKGROUND OF THE INVENTION

1. Field of the Invention

The present invention relates to communication terminal devices and communication methods, and in particular, to a communication terminal device and communication method suitable for use in communication based on, for example, TCP/IP (Transmission Control Protocol/Internet Protocol).

2. Description of the Related Art

Communication protocols of the related art for use in TCP/IP communication include a protocol called "UPnP (Universal Plug and Play)" (see, for example, UPnP Forum, [online], the Internet searched on Jul. 2, 2004 for the URL, http://www.upnp.org).

UPnP enables not only automatic mutual detection of devices on a network but also recognition of the configuration and function of each device. In UPnP, based on the result of the recognition, communication can be controlled so that an operating device can stop supplying power to an operated device.

SUMMARY OF THE INVENTION

UPnP establishes communication on the condition that there are correspondences between the devices on the network and unique IP addresses assigned to the devices. Thus, when a state in which the IP addresses are assigned is changed by, for example, DHCP (Dynamic Host Configuration Protocol), the correspondences also change, thus resulting in a situation in which communication control of a device to be operated is mistakenly performed. It is assumed that, when the devices are connected via a wireless LAN (local area network), such a situation may often occur in response to a change in topology form.

In this case, it is difficult to perform communication control so that an operating device can automatically change network settings, etc., of a device in which an IP address assignment state changes.

The present invention has been made in view of the above circumstances. It is desirable to provide a communication terminal device and a communication method that easily improve effectiveness of communication control.

According to an embodiment of the present invention, there is provided a communication terminal device for performing communication based on a communication protocol defined so that first identification information assigned to the communication terminal device is transmitted to and received from a communication party, the communication terminal device including an identification information generating means which, based on information unique to the communication terminal device, generates second identification information different from the first identification information, a storage means which stores a table representing a correspondence between the second identification information generated by the identification information generating means and the type of the communication terminal device, and a control means which controls the storage means so that communication with the communication party is established based on the table. The control means transmits the second identification information and type of the communication terminal device to unspecified destinations with predetermined timing, and updates the table based on second identification information and type of the communication party which are sent back as a response to the transmission from the communication party.

In addition, according to another embodiment of the present invention, there is provided a communication method for performing communication based on a communication protocol defined so that first identification information assigned to a communication terminal device is transmitted to and received from a communication party, the communication method including the steps of, based on information unique to the communication terminal device, generating second identification information of the communication terminal device which is different from the first identification information, storing a table representing a correspondence between the generated second identification information and the type of the communication terminal device, and transmitting the second identification information and type of the communication terminal device to unspecified destinations with predetermined timing and updating the table based on second identification information and type of the communication party which are sent back as a response to the transmission from the communication party.

According to an embodiment of the present invention, in the case of performing communication based on a communication protocol defined so that first identification information assigned to a communication terminal device is transmitted to and received from a communication party, by, based on information unique to the communication terminal device, generating second identification information of the communication terminal device which is different from the first identification information, storing a table representing a correspondence between the generated second identification information and the type of the communication terminal device, and transmitting the second identification information and type of the communication terminal device to unspecified destinations with predetermined timing and updating the table based on second identification information and type of the communication party which are sent back as a response from the communication party, the communication terminal device can communicate with the communication party based on the table irrespective of a state in which the first identification information is assigned. Thus, even if the first identification information dynamically changes, a period up to establishment of communication can be prevented from being prolonged, and a situation in which the communication terminal device communicates with a communication party other than the originally desired communication party can be prevented from occurring. Therefore, effectiveness of communication control can be easily improved.

BRIEF DESCRIPTION OF THE DRAWINGS

FIG. 9 is a block diagram showing the configuration of a communication terminal device;

FIG. 10 is a schematic illustration showing the configuration of a query packet (response packet);

FIG. 11 is an illustration of operation codes;

FIG. 12 is a timing chart showing re-sending timing;

FIG. 13 is an illustration of the configuration of a command packet;

FIG. 14 is an illustration of specific contents stored in fields;

DESCRIPTION OF THE PREFERRED EMBODIMENTS

Embodiments of the present invention are described below with reference to the accompanying drawings.

Figure 1:
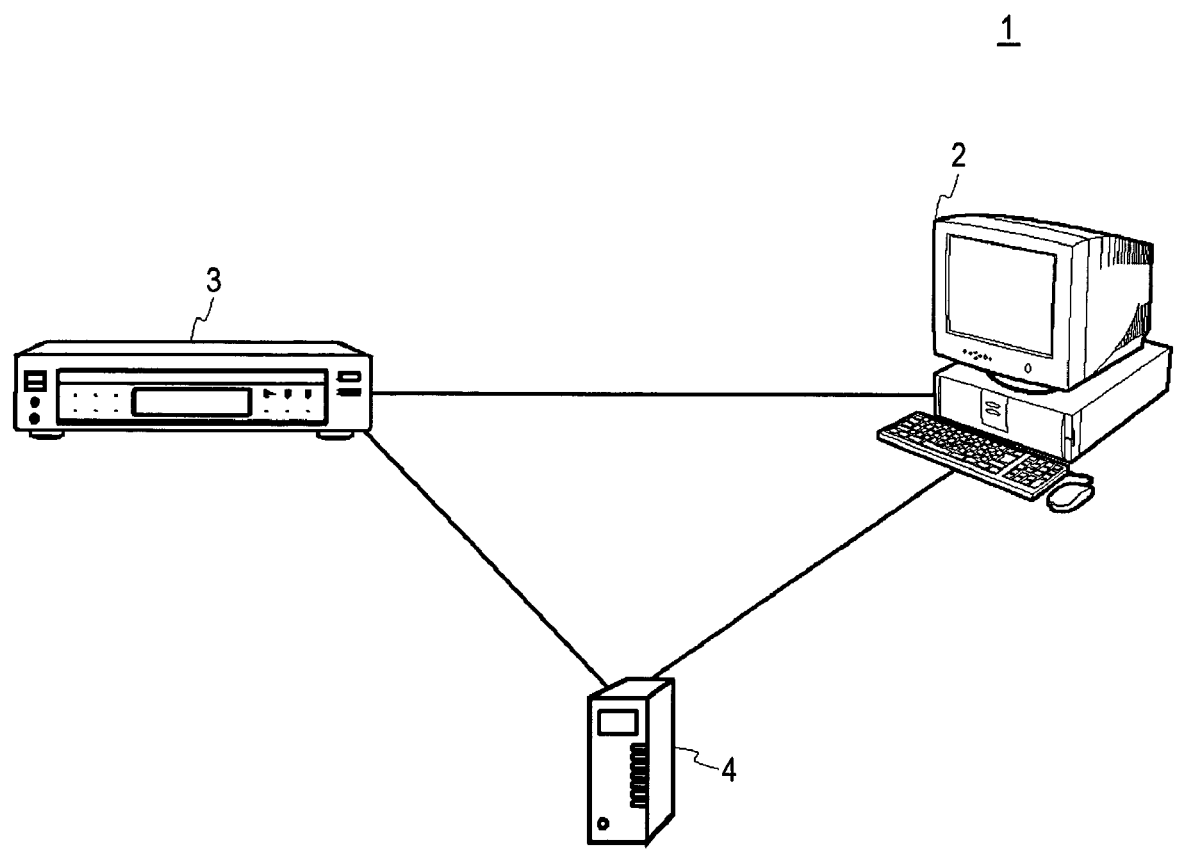
FIG. 1 is a block diagram showing the entire configuration of a communication system according to an embodiment of the present invention.

1. Entire Configuration of Communication System According to Embodiment of the Present Invention 1-1. Configuration of Communication System FIG. 1 shows the entire configuration of a communication system 1 that includes a personal computer 2, a hard disk video recorder 3, and a router 4 which are connected as communication terminal devices to one another by a local area network (LAN).

Figure 2:
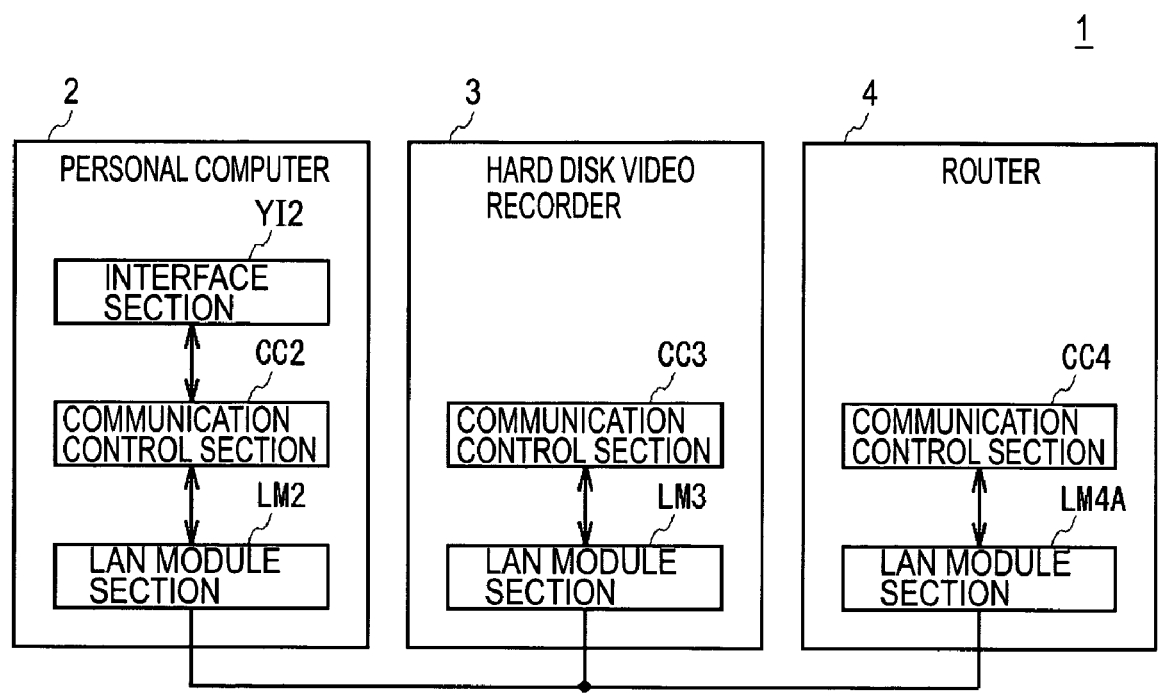
FIG. 2 is a block diagram showing the functional configurations of communication terminal devices.
Figure 3:
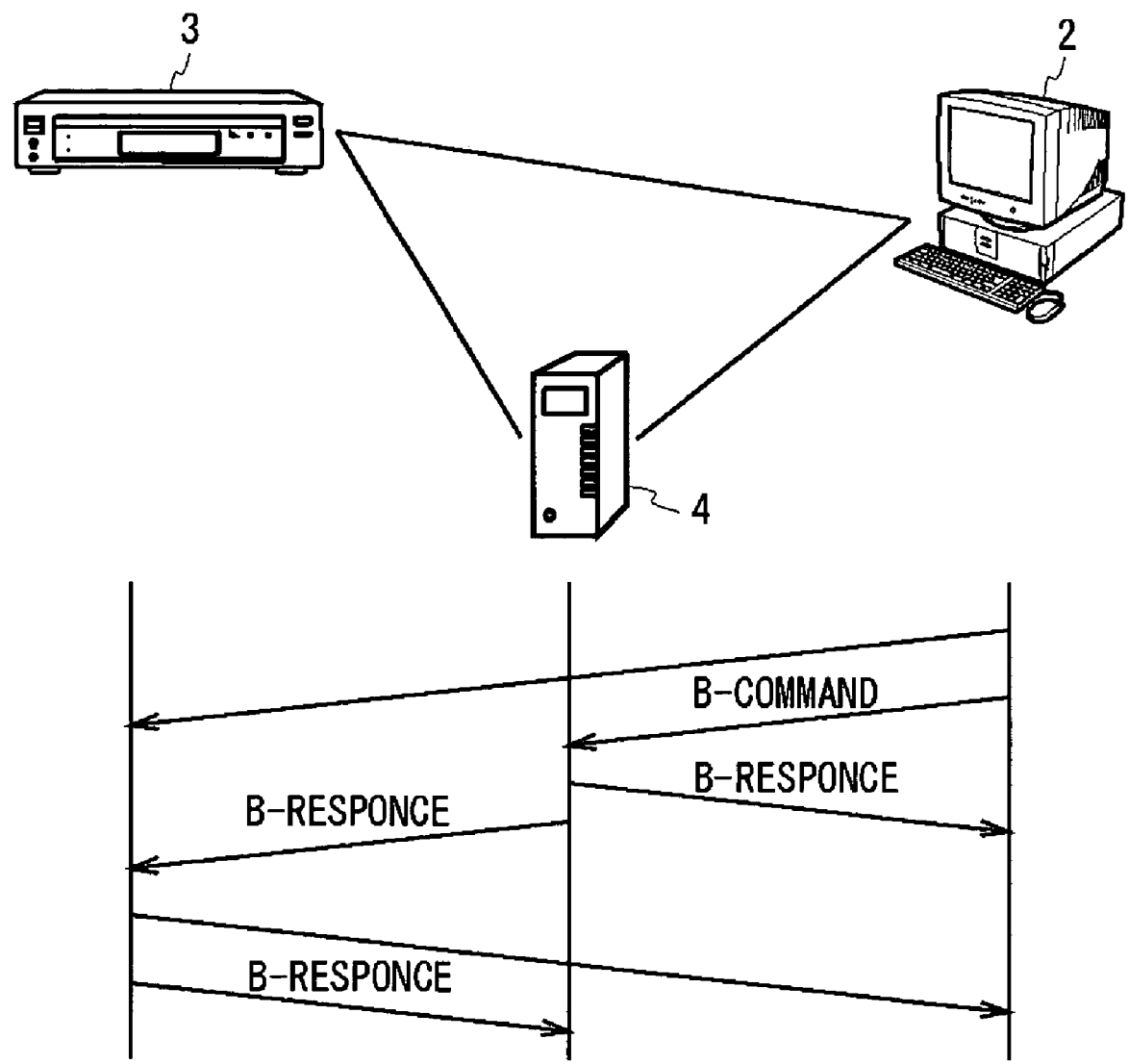
FIG. 3 is a sequence chart showing an updating process.

As shown in FIG. 2, the personal computer 2 in the communication system 1 functionally includes a LAN-based module section (hereinafter referred to as a "LAN module section") LM2, a communication control section CC2 for a communication control function, and a user interface section YI2 for a function such as a graphical user interface (GUI). Functionally, the hard disk video recorder 3 and the router 4 respectively include LAN module sections LM3 and LM4, and communication control sections CC3 and CC4.

The communication control sections CC2 to CC4 are based on TCP/IP commonly used as a set of standard communication protocols. By mutually transmitting and receiving unique IP addresses assigned to the communication control sections CC2 to CC4 through the LAN module sections LM2 to LM4, which corresponds to the IP addresses, each communication control section can recognize the correspondence between one IP address and one communication terminal device, and can communicate with a desired communication party on the basis of the result of the recognition.

Each of the communication control sections CC2 to CC4 can generate a unique identifier different from an IP address, and can store the correspondence between the unique identifier and type of a corresponding communication terminal device in table form (hereinafter referred to as an "identifier-to-type correspondence table").

Each communication control section (CC2, CC3, CC4) transmits and receives the unique identifier and the type together with the IP address. The communication control section stores, in the identifier-to-type correspondence table of the corresponding communication terminal device, the IP address of a communication party, the unique identifier, and the type in mutually associated form, and updates the table, if necessary. Based on its identifier-to-type correspondence table, the communication control section can specify and communicate with a communication party.

1-2. Updating Process

An updating process that updates the identifier-to-type correspondence table is described below with reference to FIG. 3 and FIGS. 4A to 4D.

The communication control section CC2 in the personal computer 2 can detect as changes in the state of the personal computer 2, a power supply (activation) instruction to the personal computer 2, an instruction to return from a power saving mode for saving power consumption, a LAN connection notifying signal for reporting connection to the LAN, etc.

Figure 4A:
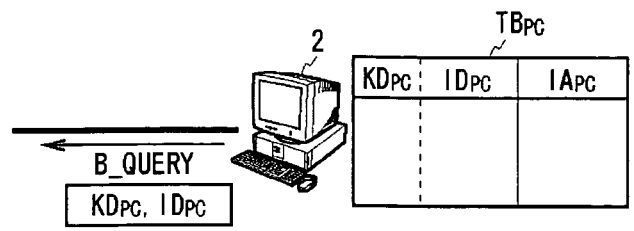
FIGS. 4A to 4D are schematic illustrations showing second updating processes.

After detecting a change in the state, the communication control section CC2 generates, as a query packet (B_QUERY), the type $KD_{PC}$ and unique identifier $ID_{PC}$ of the personal computer 2 which are registered beforehand in the identifier-to-type correspondence table $TB_{PC}$ of the personal computer 2, and broadcasts the query packet from the LAN module section LM2, as shown in FIG. 4A.

Figure 4B:
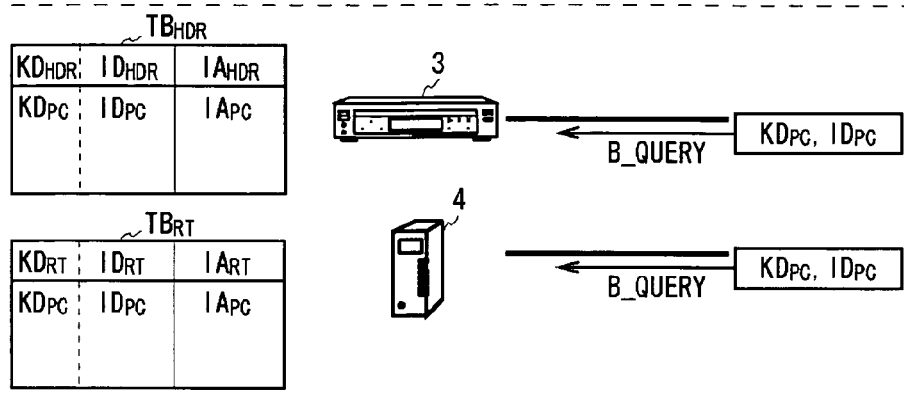

As shown in FIG. 4B, when the communication control section CC3 in the hard disk video recorder 3 receives the query packet through the LAN module section LM3, it records, based on the query packet, the type $KD_{PC}$ and unique identifier $ID_{PC}$ of the personal computer 2 in the identification-to-type correspondence table $TB_{HDR}$ of the hard disk video recorder 3.

The communication control section CC3 generates, in the form of a response packet (B_RESPONSE), type $KD_{HDR}$ and unique identifier $ID_{HDR}$ of the hard disk video recorder 3 which are registered beforehand in an identification-to-type correspondence table $TB_{HDR}$ of the hard disk video recorder 3, and broadcasts the response packet from the LAN module section LM3.

Figure 4C:
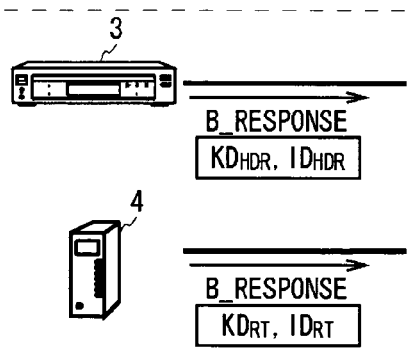

As shown in FIGS. 4B and 4C, similarly, based on the query packet received through the LAN module section LM4, the communication control section CC4 in the router 4 registers, in an identification-to-type correspondence table $TB_{RT}$ of the router 4, the type $KD_{PC}$ and unique identifier $ID_{PC}$ of the personal computer 2, and broadcasts the type $KD_{RT}$ and unique identifier $ID_{RT}$ of the router 4 in the form of a response packet.

Figure 4D:
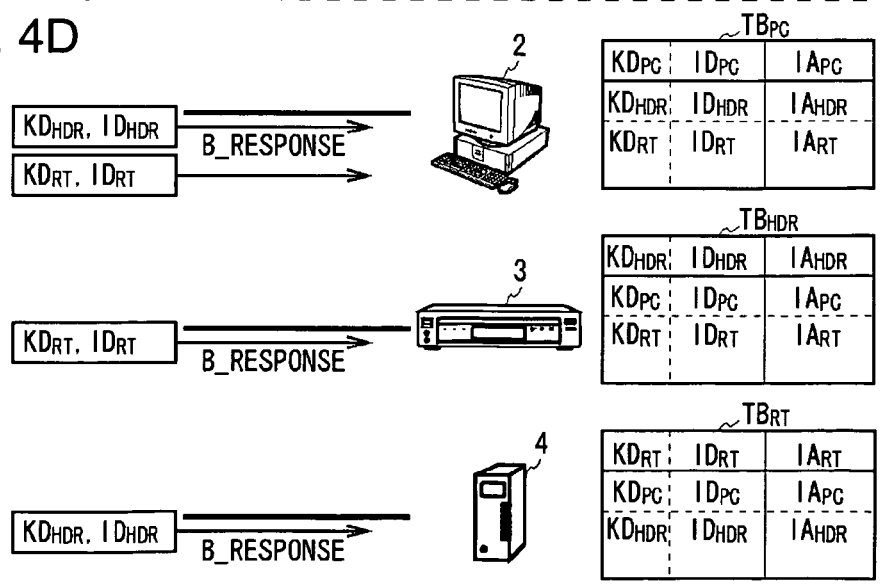
Figure 5:
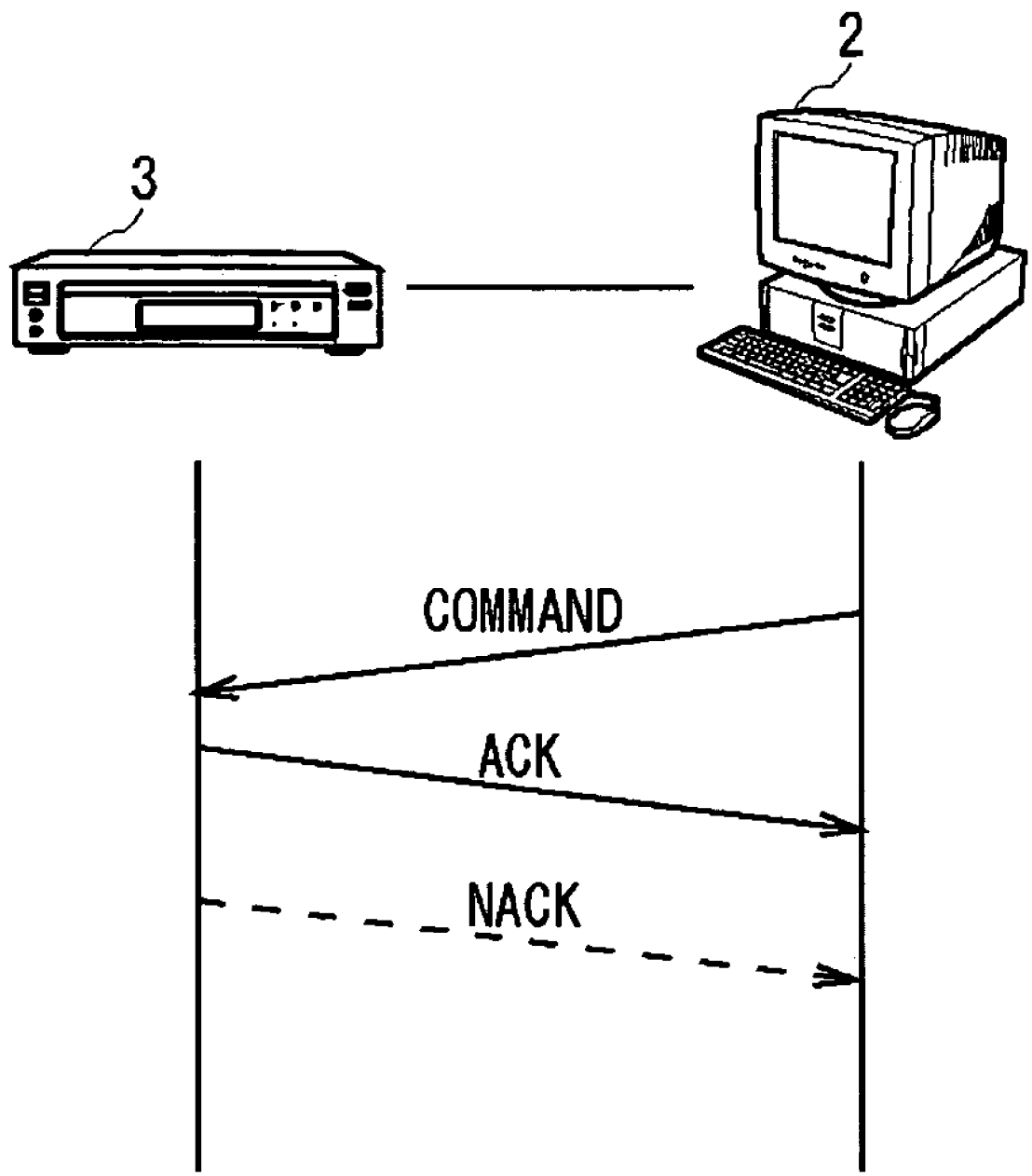
FIG. 5 is a sequence chart showing an executing process.

As shown in FIG. 4D, when the communication control section CC2 in the personal computer 2 receives the response packets broadcast from the hard disk video recorder 3 and the router 4 through the LAN module section LM2, it registers, in the identifier-to-type correspondence table $TB_{PC}$ of the personal computer 2, the type $KD_{HDR}$ and unique identifier $ID_{HDR}$ of the hard disk video recorder 3 and the type $KB_{RT}$ and unique identifier $ID_{RT}$ of the router 4 on the basis of the received response packets. After that, the communication control section CC2 discards the response packets.

As a result, the personal computer 2 stores the identifier-to-type correspondence table $TB_{PC}$ updated to include the type $KD_{HDR}$ and unique identifier $ID_{HDR}$ of the hard disk video recorder 3 and the type $KD_{RT}$ and unique identifier $ID_{RT}$ of the router 4.

Similarly, based on the response packet broadcast from the router 4, the communication control section CC3 in the hard disk video recorder 3 registers, the identification-to-type correspondence table $TB_{HDR}$ of the hard disk video recorder 3, the type $KD_{RT}$ and unique identifier $ID_{RT}$ of the router 4, and subsequently discards the response packet. In addition, as shown in FIG. 4D, based on the response packet broadcast from the hard disk video recorder 3, the communication control section CC4 in the router 4 registers, in the identification-to-type correspondence table $TB_{RT}$ of the router 4, the type $KD_{HDR}$ and unique identifier $ID_{HDR}$ of the hard disk video recorder 3, and subsequently discards the response packet.

As a result, the hard disk video recorder 3 stores the identification-to-type correspondence table $TB_{HDR}$ updated to include the type $KD_{PC}$ and unique identifier $ID_{PC}$ of the personal computer 2 and the type $KD_{RT}$ and unique identifier $ID_{RT}$ of the router 4. In addition, the router 4 stores the identification-to-type correspondence table $TB_{RT}$ updated to include the type $KD_{PC}$ and unique identifier $ID_{PC}$ of the personal computer 2 and the type $KD_{HDR}$ and unique identifier $ID_{HDR}$ of the hard disk video recorder 3.

As described above, the personal computer 2, the hard disk video recorder 3, and the router 4 can update their identification-to-type correspondence tables $TB_{PC}$, $TB_{HDR}$, and $TB_{RT}$.

As shown in FIGS. 4B and 4C, when, in this updating process, each communication control section broadcasts the type and unique identifier of each communication terminal device, it transmits he assigned IP address ($IA_{PC}$, $IA_{HDR}$, $IA_{RT}$) in accordance with the User Datagram Protocol (UDP), and can register, in the identification-to-type correspondence table of the communication terminal device, the type and unique identifier of another communication terminal device which are received from another communication control section in a form in which the received type unique identifier are associated with the IP address transmitted in accordance with the UDP.

Regarding the above updating process, a case in which the communication control section CC2 in the personal computer 2 detects a change in the state of the personal computer 2 has been described. In addition, when the communication control section CC3 in the hard disk video recorder 3 (or the communication control section CC4 in the router 4) detects a change in the state of the hard disk video recorder 3, the communication control section CC3 (or CC4) broadcasts a query packet, and the communication control section CC2 in the personal computer 2 and the communication control section CC4 in the router 4 (or the communication control section CC2 in the personal computer 2 and the communication control section CC3 in the hard disk video recorder 3) broadcast response packets, whereby, similarly to the above case, the identification-to-type correspondence table of the hard disk video recorder 3 (or CC4) is updated.

As described above, in the communication system 1, among the communication terminal devices connected to the LAN, a communication terminal device, which detects a change in its state, serves as an origin to start the updating process, the communication terminal device as the origin and the other communication terminal devices exchange their types and unique identifiers, whereby their identification-to-type correspondence tables are updated.

Therefore, in the communication system 1, each communication terminal device can communicate with a communication party without depending on an IP address on the basis of its identification-to-type correspondence table that is automatically updated in response to a change in its state. Thus, the communication system 1 can prevent a situation in which immediacy until establishing the communication is damaged.

1-3. Control Process

In addition to the above-described construction, in the communication system 1, the personal computer 2 including the user interface YI2 can function as a master for the hard disk video recorder 3 and the router 4 which do not include the user interface YI2. Accordingly, the personal computer 2 can control the hard disk video recorder 3 and the router 4 by using its identifier-to-type correspondence table $TB_{PC}$.

Based on differences in details of control, this control process is broadly divided into a process (hereinafter referred to as an "executing process") that controls the hard disk video recorder 3 and the 4 so as to execute processing such as power supplying and video recording, and a process (hereinafter referred to as a "network-setting changing process") that controls the hard disk video recorder 3 and the router 4 to change network settings. Accordingly, the executing process and the network-setting changing process are separately described below.

1-3-1. Executing Process

The communication control section CC2 in the personal computer 2 can detect an operating instruction to a communication terminal device in the communication system 11 which is supplied from an external network or the user interface YI2 to the communication system 1.

Figure 6A:
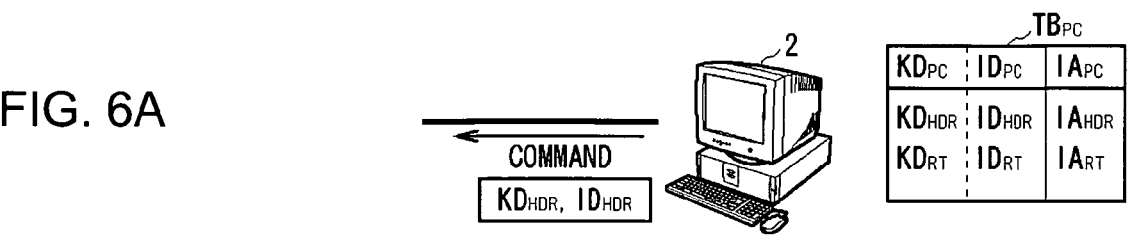
FIGS. 6A to 6C are schematic illustrations showing executing processes.

As shown in FIGS. 5 and 6A to 6C, after the communication control section CC2 detects the operating instruction, and specifies a communication terminal device designated by the operating instruction, as shown in FIG. 6A, the communication control section CC2 generates and unicasts a command packet including, for example, the type $KD_{HDR}$ and unique identifier $ID_{HDR}$ of the hard disk video recorder 3, and a command corresponding to processing specified by the operating instruction.

Figure 6B:
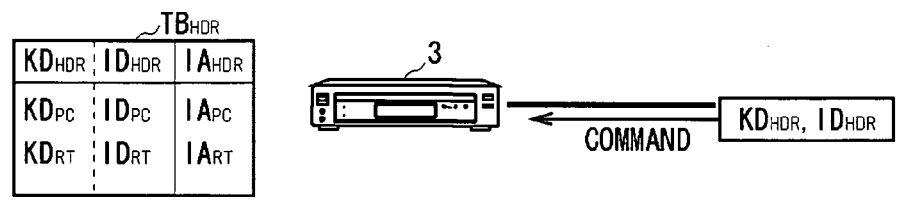

When the communication control section CC3 in the hard disk video recorder 3 receives the command packet, as shown in FIG. 6B, the communication control section CC3 determines whether the unique identifier $ID_{HDR}$ in the command packet coincides with the unique identifier $ID_{HDR}$ of the hard disk video recorder 3 which is registered in the identification-to-type correspondence table $TB_{HDR}$.

In this case, since the unique identifier $ID_{HDR}$ in the command packet coincides with the unique identifier $ID_{HDR}$ of the hard disk video recorder 3 which is registered in the identification-to-type correspondence table $TB_{HDR}$, in accordance with the command in the command packet, the communication control section CC3 executes processing, specified by the operating instruction, such as power supplying or video recording.

Figure 6C:
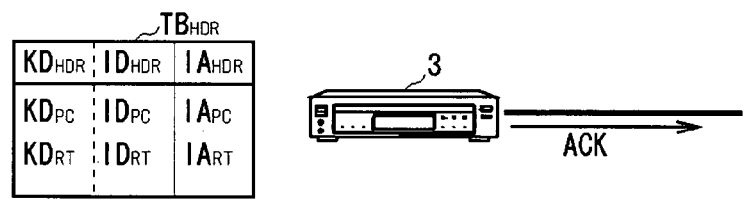

As shown in FIG. 6C, the communication control section CC3 generates, as an affirmative response to the command packet, an acknowledgement packet (ACK) including the result of executing the processing, and unicasts the acknowledgement packet to the personal computer 2.

If the unique identifier $ID_{HDR}$ in a unicast command packet does not coincide with the unique identifier $ID_{HDR}$ of the hard disk video recorder 3 which is registered in the identification-to-type correspondence table $TB_{HDR}$, the communication control section CC3 discards this command packet, and unicasts, as a negative response to the command packet, a negative acknowledgement packet ("NACK" in FIG. 5) including a cause of no execution of processing corresponding to the command in the command packet. In this case, the personal computer 2 unicasts the above command packet again in accordance with the cause of no execution of the processing corresponding to the command.

As described above, by transmitting a command (corresponding to the operating instruction) on the basis of a unique identifier to a corresponding communication terminal device, the personal computer 2 can control the communication terminal device to execute processing corresponding to the command irrespective of an IP address assignment state of the communication terminal device.

Therefore, in the communication system 1, by transmitting, to the personal computer 2, electronic mail including an operating instruction from, for example, a cellular phone or the like via the Internet, a user can remote-control a corresponding communication terminal device through the personal computer 2.

1-3-2. Network-setting Changing Process

Figure 7:
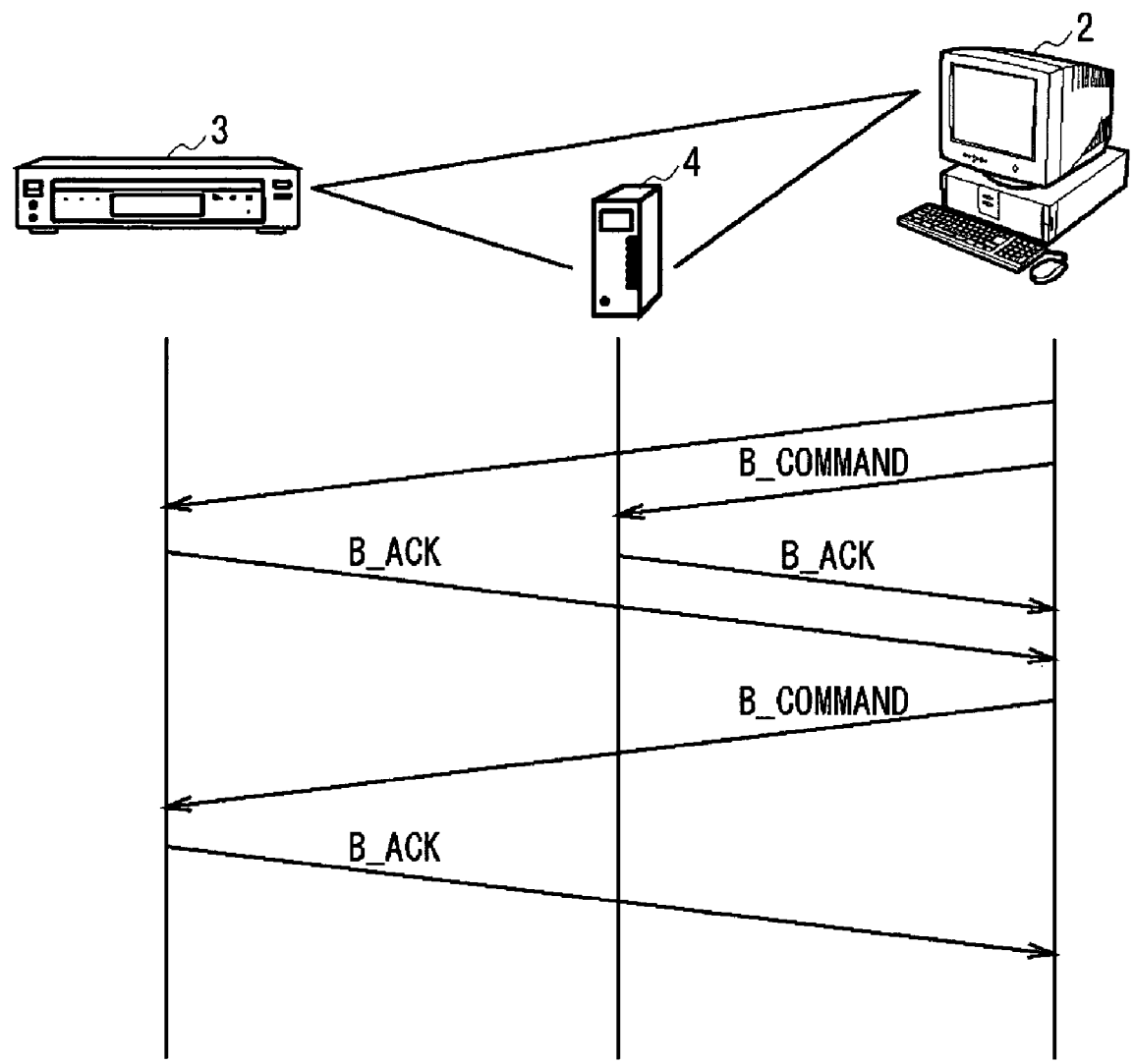
FIG. 7 is a sequence chart showing a network-setting changing process.

Referring to FIG. 7, after the communication control section CC2 in the personal computer 2 detects a network-setting collecting request from the user interface YI2, it generates and broadcasts a command packet (B_COMMAND) including codes representing all the unique identifiers of all the communication terminal devices and a command to request reporting network settings at present.

After the communication control section CC3 in the hard disk video recorder 3 receives the command packet, it generates and broadcasts, as a response to the command packet, an acknowledgement packet (B_ACK) including its network settings at present.

Similarly, the communication control section CC4 in the router 4 generates and broadcasts, as a response to the command packet, an acknowledgement packet (B_ACK) including the network settings at present of the hard disk video recorder 3.

As a result, by simply performing, by the user, an operation to request collecting network settings, network settings at present of the communication terminal devices (the hard disk video recorder 3 and the router 4) on the LAN can be automatically transmitted to the personal computer 2.

In addition, after the communication control section CC2 in the personal computer 2 receives the acknowledgement packet broadcast from the hard disk video recorder 3, it displays, on a display section, through the user interface YI2, the network settings at present of the personal computer 2 in the acknowledgement packet.

As described above, the communication system 1 enables the user to confirm network settings of a communication terminal device on the LAN without a user's operation on the communication terminal device.

Figure 8A:
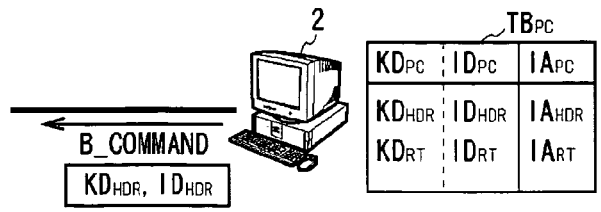
FIGS. 8A to 8D are schematic illustrations showing network-setting changing processes.

When, in this state, the user operates the user interface YI2 so as to change the network settings of, for example, the hard disk video recorder 3, the communication control section CC2 generates a command packet (B_COMMAND) including the changed network settings and the type $KD_{HDR}$ and unique identifier $ID_{HDR}$ of the hard disk video recorder 3, as shown in FIGS. 7 and 8A to 8D, and broadcasts the command packet, as shown in FIG. 8A.

Figure 8B:
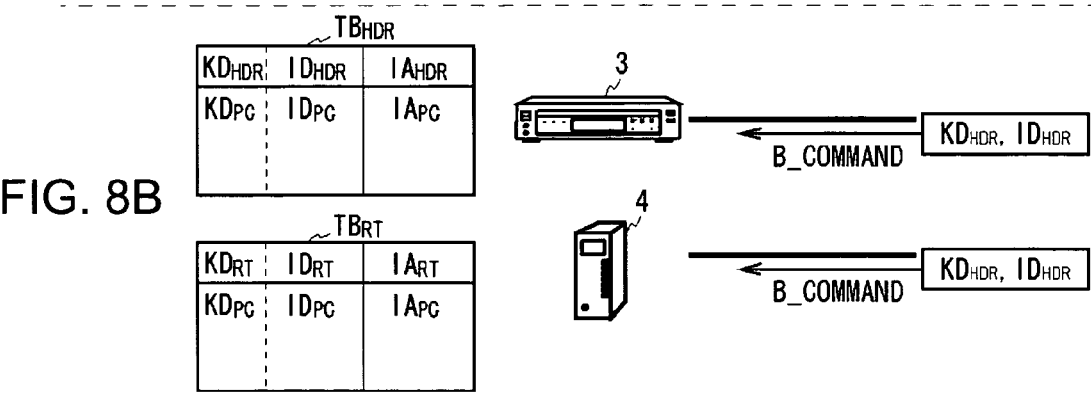

After the communication control section CC3 in the hard disk video recorder 3 receives the command packet, as shown in FIG. 8B, it determines whether the unique identifier $ID_{HDR}$ in the command packet coincides with the unique identifier $ID_{HDR}$ of the hard disk video recorder 3 which is registered in the identification-to-type correspondence table $TB_{HDR}$.

Figure 8C:
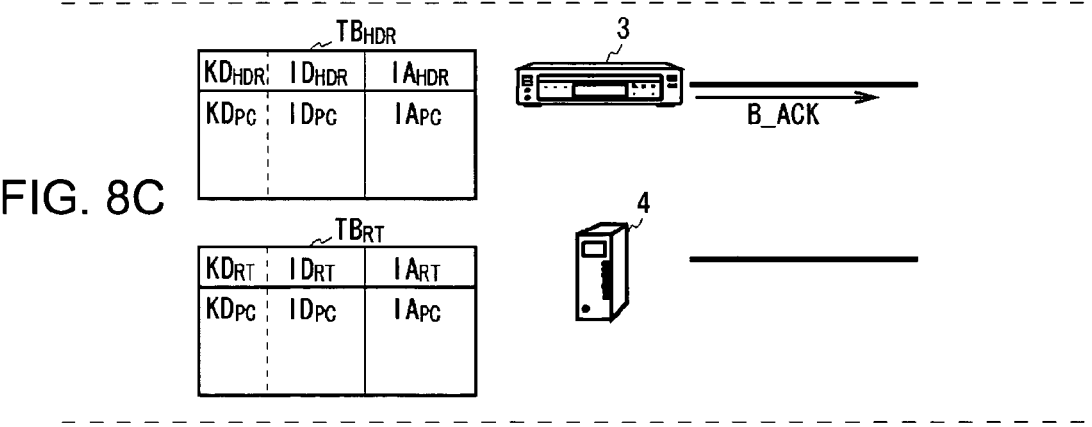
Figure 8D:
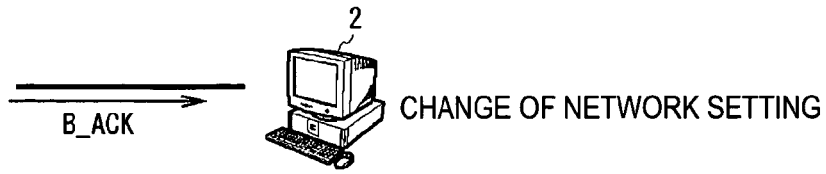

In this case, since the unique identifier $ID_{HDR}$ in the command packet coincides with the unique identifier $ID_{HDR}$ of the hard disk video recorder 3 which is registered in the identification-to-type correspondence table $TB_{HDR}$, the communication control section CC3 changes the network settings of the hard disk video recorder 3 to the changed network settings, and broadcasts, as a response to the command packet, an acknowledgement packet (B_ACK) including the result of executing processing, as shown in FIG. 8C.

Similarly to the communication control section CC3, the communication control section CC4 in the router 4 can recognize whether the command packet is addressed to the router 4 on the basis of the identification-to-type correspondence table $TB_{RT}$ of the router 4. In this case, since the unique identifier $ID_{HDR}$ in the command packet does not coincide with the unique identifier $ID_{RT}$ of the router 4, the communication control section CC4 discards the command packet, as shown in FIGS. 8B and 8C.

As a result, in the communication system 1, only the network settings of the hard disk video recorder 3, which are requested to be changed by the personal computer 2, are changed.

In the communication system 1, irrespective of the IP address assignment state, from the personal computer 2 including the user interface YI2, network settings of a communication terminal device on the LAN which does not include the user interface YI2, can be displayed and changed.

Therefore, it is ensured that the user can confirm network settings of a communication terminal device on the LAN without operating the communication terminal device and can change the network settings, if necessary.

2. Configuration of Communication Terminal Device 2-1. Hardware Configuration of Communication Terminal Device FIG. 9 shows a hardware configuration common to the functional sections LM2, CC2, and YI2, LM3 and CC3, and LM4 and CC4 (FIG. 2), the hard disk video recorder 3, and the router 4 as the communication terminal devices.

As shown in FIG. 9, the communication terminal device (each of the personal computer 2, the hard disk video recorder 3, and the router 4) includes a central processing unit (CPU) 10, and a read-only memory (ROM) 11, a random access memory (RAM) 12 as a work memory, a storage memory 13 storing an identification-to-type correspondence table TB, an operating section 14, a display section 15, a communicating section 16, and a clock section 17 that are connected to the CPU 10 by a bus 18.

The CPU 10 loads a program stored in the ROM 11 into the RAM 12, if necessary, and executes processing in each set of the functional sections LM2, CC2, and YI2, LM3 and CC3, and LM4 and CC4 by controlling the storage memory 13, the display section 15, the communicating section 16, and the clock section 17 in accordance with the loaded program.

In this case, the CPU 10 transmits, from the communicating section 16 to another communication terminal device via the LAN, various data items such as a query packet, a response packet, a command packet, an acknowledgement packet, or audio-video data, and manages a retransmission time or the like of the packet based on a count value in the clock section 17.

In addition, based on a response received from another communication terminal device through the communicating section 16, the CPU 10 can update the contents of the identification-to-type correspondence table TB stored in the storage memory 13, if necessary.

2-2. Specific Processing in Communication Terminal Device in Updating Process

Regarding specific processing in the communication terminal device, for description, specific processing in the updating process is divided into an updating process in a communication terminal device (hereinafter referred to as an "originating communication terminal device") serving as an origin for the updating process and an updating process in each of communication terminal devices (hereinafter referred to as "intermediate communication terminal devices") other than the originating communication terminal device.

2-1-1. Updating Process in Originating Communication Terminal Device

In this case, when the CPU 10 in the originating communication terminal device (the personal computer 2, the hard disk video recorder 3, or the router 4) detects a power supplying (activation) instruction or a return instruction to return from a standby mode (power saving mode) supplied from the display section 15, or a LAN-connection notification signal supplied from the communicating section 16, the CPU 10 generates the query packet QP shown in FIG. 10.

This query packet QP includes fields $F_1$ to $F_5$ corresponding to 1-byte "op", 1-byte "reserve", 2-byte "src type", 4-byte "xid", and 16-byte "srcID", respectively.

The "op" field $F_1$ stores an operation code representing a packet type. The "reserve" field $F_2$ stores an item that is defined in future. The "src type" field $F_3$ stores a code representing type KD of the originating communication terminal device. The "xid" field $F_4$ stores random characters provided for each packet in order to ensure packet correspondence. The "srcID" field $F_5$ stores the unique identifier ID of the originating communication terminal device.

The unique identifier ID is formed by a value (initial value) generated based on an MAC address, and can be rewritten by a proper noun such as "Mr. _____'a PC", or the like, if necessary.

In this embodiment, as shown in FIG. 11, the operation code has the following assigned values. The value "1" is assigned to the query packet (B_QUERY). The value "2" is assigned to the response packet (B_RESPONSE). The value "3" is assigned to the command packet (COMMAND) for unicast. The value "4" is assigned to the acknowledgement packet (ACK) for unicasts. The value "5" is assigned to the negative acknowledgement packet for unicast. The value "6" is assigned to the command packet (B_COMMAND) for broadcast. The value "7" is assigned to the affirmative acknowledgement packet (B_ACK) for broadcast. The value "8" is assigned to the negative acknowledgement packet (B_NAK) for broadcast.

Accordingly, the "op" field $F_1$ of the query packet QP has "1", and the "src type" and "srcID" fields $F_3$ and $F_5$ store the type (KD) code and unique identifier ID registered beforehand in the identification-to-type correspondence table TB of the originating communication terminal device, respectively.

The CPU 10 broadcasts the query packet QP through the communicating section 16. As a result, the type KD and identifier ID of each intermediate communication terminal device (the personal computer 2, the hard disk video recorder 3, or the router 4) connected to the LAN in the communication system 1, and a request to collect the type KD and identifier ID of the intermediate communication terminal device are delivered to the intermediate communication terminal device irrespective of an IP address assignment state.

In this state, the CPU 10 awaits a response packet RP (FIG. 10) broadcast, as a response to the query packet QP, from the intermediate communication terminal device. The response packet RP is obtained by changing the items in the fields $F_1$, $F_3$, and $F_5$ of the query packet QP. The "op" field $F_1$ stores an option code (i.e., "2" (FIG. 11)) for the response packet RP instead of the option code (i.e., "1" (FIG. 11)) for the query packet QP. The "src type" and "srcID" fields $F_3$ and $F_5$ respectively store a code representing the type KD of the intermediate communication terminal device which broadcasts the response packet RP, and the identifier ID of the intermediate communication terminal device instead of the type KD and identifier ID of the originating communication terminal device. Therefore, the type KD and identifier ID of the intermediate communication terminal device are delivered to the originating communication terminal device irrespective of the IP address assignment state of the originating communication terminal device.

When the CPU 10 receives the response packet RP through the communicating section 16, it determines whether the received response packet RP responds to the query packet QP broadcast by the CPU 10 on the basis of the character stored in the "xid" field $F_4$ of the response packet RP.

If the received response packet RP does not respond to the query packet QP broadcast by the CPU 10, it is indicated that there is another communication terminal device, connected to the LAN in the communication system 1, serving as an origin to transmit the query packet QP. In this case, the originating communication terminal device serves as an intermediate communication terminal device to perform the updating process.

If the received response packet RP responds to the query packet QP broadcast by the CPU 10, and a code represented by the type KD stored in the "src type" $F_3$ of the response packet RP is not registered in the identification-to-type correspondence table TB of the communication terminal device, the CPU 10 registers the type (KD) code in the "src type" $F_3$ and the unique identifier ID in the "srcID" $F_5$ in a form in which both are associated with each other.

Unlike that, if the type (KD) code in the "src type" field $F_3$ which represents the type KD is already registered in the identification-to-type correspondence table TB of the communication terminal device, only when the unique identifier ID which is registered in the identification-to-type correspondence table TB and which corresponds to the type KD is not identical to the unique identifier ID in the "srcID" field $F_5$, the CPU 10 registers the code in the "src type" field $F_3$ which represents the type (KD) code and the unique identifier ID in the "srcID" field $F_5$ in a form in which both are associated with each other.

In addition, when both the type (KD) code in the "src type" field $F_3$ and the unique identifier ID in the "srcID" field $F_5$ are already registered, the CPU 10 discards the response packet RP.

Based on the count value in the communicating section 16, the CPU 10 can re-broadcast the query packet QP after one second, two seconds, and five seconds from the time the CPU 10 initially broadcasts the query packet QP, as shown in FIG. 12.

In this case, the CPU 10 avoids repeated registration to the identification-to-type correspondence table TB by, whenever receiving-the response packet RP, determining whether the character in the "xid" field $F_4$ and the unique identifier ID in the "srcID" field $F_5$ are identical to those in the previously received response packet RP.

If, even after eight seconds elapse from initial-transmission, the CPU 10 does not receive the response packet RP which responds to the type KD and unique identifier ID already registered in the identification-to-type correspondence table TB of the communication-terminal device, the CPU 10 can delete the type KD and the corresponding unique identifier ID from the identification-to-type correspondence table TB.

When the originating communication terminal device detects a power supplying (activation) instruction, an instruction to return from the standby (power saving) mode, or a LAN-connection signal from the communicating section 16, the CPU 10 can broadcast the query packet QP and can update the identification-to-type correspondence table TB of the originating communication terminal device in response to the result of receiving the response packet RP responding to the query packet QP and the registered contents of the identification-to-type correspondence table TB of the originating communication terminal device. Accordingly, the originating communication terminal device can grasp another communication terminal device connected to the LAN in accordance with broadcasting of the query packet QP. The LAN-connection signal is supplied to the communicating section 16, for example, when a new communication terminal device connects to the LAN or re-connects to the LAN.

2-2-2. Updating Process of Intermediate Communication Terminal Device

In this case, when the CPU 10 in the intermediate communication terminal device receives the query packet QP (FIG. 10) through the communicating section 16, similarly to the case of the above originating communication terminal device, the CPU 10 updates the identification-to-type correspondence table TB of the originating communication terminal device by registering a new type KD and unique identifier ID in response to the type (KD) code and unique identifier ID in the "src type" field $F_3$ and "srcID" field $F_5$ of the query packet QP, and the registered contents of the identification-to-type correspondence table TB of the originating communication terminal device.

As described above in the updating process of the originating communication terminal device, the CPU 10 can change the field $F_1$ of the query packet QP received that time. In addition the CPU 10 can generate the response packet RP by changing the fields $F_3$ and $F_5$ to corresponding items of the identification-to-type correspondence table TB of the originating communication terminal device, and can broadcast the generated response packet RP.

As described above, the intermediate communication terminal device can update the identification-to-type correspondence table TB of the intermediate communication terminal device in response to the result of receiving the query packet QP and the registered contents of the identification-to-type correspondence table TB of the intermediate communication terminal device. Accordingly, the intermediate communication terminal device can grasp for example, a state in which a new communication terminal device connects to the LAN, and re-connection to the LAN.

2-3. Specific Processing of Communication Terminal Device in Executing Process

Next, the detailed processing of the communication terminal device in the executing process is divided for description into a requesting process of a communication terminal device (hereinafter referred to as a "main communication terminal device") on a controlling side and a responding process of a communication terminal device (hereinafter referred to as a "sub communication terminal device") on a controlled side.

2-3-1. Requesting Process of Main Communication Terminal Device

In this case, when the CPU 10 in the main communication terminal device (the personal computer 2) detects an operating instruction which is supplied from the operating section 14 or the communicating section 16 to the sub communication terminal device, the CPU 10 generates the command packet CP based on the content of the operating instruction and the identification-to-type correspondence table TB stored in the storage memory 13.

The command packet CP includes, in addition to the fields $F_1$ to $F_5$ (FIG. 10) for "op", "reserve", "src type", "xid", and "srcID", a 16-byte "dstID" field $F_6$, an 1-byte "command" field $F_7$, a 3-byte "cmd dependent" field $F_8$, and an n-byte "option" field $F_9$ (n 1, 2, 3, ... ).

The "dstID" field $F_5$ stores the unique identifier ID of the sub communication terminal device, and the "command" field $F_7$ stores a code representing a command corresponding to processing specified by the operating instruction. In addition, the "cmd dependent" field $F_8$ stores an item related to the command, and the "option" field $F_9$ stores an extended item, if necessary.

In the case of this embodiment, the "command" $F_7$ stores, for example, the following commands: "Change State" for requesting the execution of power-related processing such as power supplying, power supply stopping, power-saving-mode processing, and power-saving-mode cancellation, "GetState" for requesting reporting which one of an operable state and inoperable state the sub communication terminal device is in, that is, which of an power-on state and standby state (power saving mode) the sub communication terminal device is in, "Replay" that is used for a replay concerning whether the execution of processing corresponding to each of various commands impossible or difficult, "Ext Command" for requesting the execution of processing other than the power-related processing among various types of processing by the sub communication terminal device, and "Ext Replay" that is used for a reply concerning whether reception of the "Ext Command" is possible or difficult. In the "cmd dependent" field $F_8$, a code that represents the power supplying specified by an operating instruction, or the type of other processing, is stored as an item associated with the command, if necessary. In the "option" field $F_9$, the processing type is described in a predetermined language, if necessary.

When, actually, the operating instruction to the sub communication terminal device is, for example, an instruction to request the execution of the power-related processing, as shown in FIG. 14, the "op" field $F_1$ of the command packet CP stores an option code (i.e., "3" in FIG. 11) for the command packet for unicast, and the "src type" field $F_3$ and the "srcID" field $F_5$ respectively store a code representing the type $KD_{PC}$ and unique identifier $ID_{PC}$ of the main communication terminal device.

The "dstID" field $F_5$ stores the unique identifier ID of the sub communication terminal device which is specified by the operating instruction, and the "command" field $F_7$ stores the code of "Change State" ("1" in this embodiment). The "cmd dependent" field $F_8$ (FIG. 13) includes a 1-byte "state flag" field and a 2-byte "reserve" field. In the "state flag" field, one of flags corresponding to the standby state (power saving mode), an off state, restart, etc., is stored as a specific type of processing related to the power.

The CPU 10 unicasts the above command packet CP through the communicating section 16. As a result, the type of processing specified by the operating instruction is delivered to the sub communication terminal device (the hard disk video recorder 3 or the router 4) specified by the operating instruction irrespective of the IP address assignment state of the sub communication terminal device.

Figure 15:
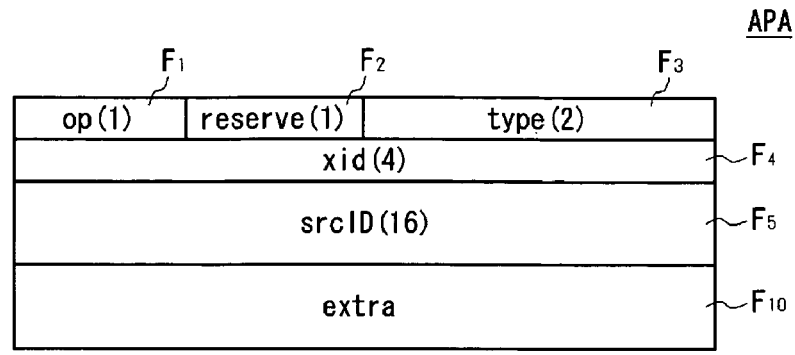
FIG. 15 is an illustration of an affirmative acknowledgement packet.
Figure 16:
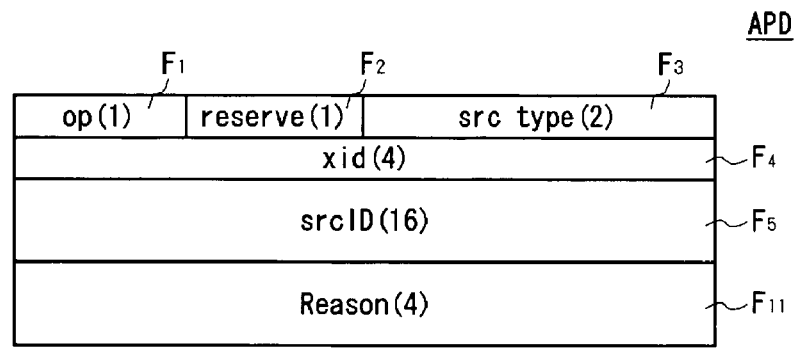
FIG. 16 is an illustration of a negative acknowledgement packet.

In this state, the CPU 10 awaits, as a response to the command packet CP, the affirmative acknowledgement packet APA shown in FIG. 15 or the negative acknowledgement packet APD shown in FIG. 16 which is unicast from the sub communication terminal device.

The affirmative acknowledgement packet APA includes an n-byte "extra" field $F_{10}$ in addition to the fields $F_1$ to $F_5$ (FIG. 10) for "op", "reserve", "src type", "xid", and "srcID". The negative acknowledgement packet APD includes a 4-byte "reason" field $F_{11}$ in addition to the fields $F_1$ to $F_5$ for "op", "reserve", "src type", "xid", and "srcID". In the "extra" field $F_{11}$, a result in response to the command in the command packet CP (FIG. 13), or the like, is stored, if necessary. In the "reason" field $F_{11}$, a cause of no execution of processing in response to the command in the command packet CP is stored.

The "reserve" field $M_2$ and the "xid" field $F_4$ are identical in stored content to the corresponding fields $F_2$ and $F_4$. In the "op" field $F_1$, the option code (i.e., "14" or "5" in FIG. 11) of the acknowledgement packet AP (APA or APD) is stored. In the "src type" field $F_3$ and "srcID" field $F_5$, a code representing the type KD of the sub communication terminal device which transmits the acknowledgement packet and its unique identifier ID are stored, respectively.

When the CPU 10 receives the acknowledgement packet AP through the communicating section 16, the CPU 10 stops the requested processing if the acknowledgement packet AP is identified as an affirmative acknowledgement packet APA, and, if the acknowledgement packet AP is identified as a negative acknowledgement packet APD, unicasts the above command packet CP again in response to the cause stored in the "reason" in the negative acknowledgement packet APD.

As described above, by unicasting, to a communication terminal device, a command corresponding to processing specified by an operating instruction on the basis of a unique identifier ID, the main communication terminal device can request the communication terminal device to execute the processing specified by the operating instruction.

2-3-2. Responding to Request by Sub Communication Terminal Device

In this case, after the CPU 10 in the sub communication terminal device (the hard disk video recorder 3 or the router 4) receives the command packet CP (FIG. 13), the CPU 10 determines whether the unique identifier ID stored in the "dstID" field $F_5$ coincides with the unique identifier ID of the sub communication terminal device which is registered in the identification-to-type correspondence table TB of the sub communication terminal device.

If the unique-identifier ID in the command packet CP coincides with the unique identifier ID of the sub communication terminal device, after the CPU 10 executes processing corresponding to contents in the "command" field $F_7$, the "cmd dependent" field $F_8$, and the "option" field $F_9$, the CPU 10 generates and unicasts the above affirmative acknowledgement packet APA (FIG. 15).

If the unique identifier ID in the command packet CP does not coincide with the unique identifier ID of the sub communication terminal device, the CPU 10 generates and unicasts the negative acknowledgement packet APD (FIG. 16).

As described above, only when the sub communication terminal device receives the command packet CP corresponding to its unique identifier ID does it execute processing corresponding to the content of the command packet CP.

2-4. Specific Processing of Communication Terminal Device in Network-setting changing Process of Sub Communication Terminal Device Next, specific processing of a communication terminal device is described below in a form divided into a requesting process of the main communication terminal device and a responding process.

2-4-1. Requesting Process of Main Communication Terminal Device

In this case, after the CPU 10 in the main communication terminal device (personal computer 2) detects a change command to change network settings which are supplied from the operating section 14, the CPU 10 generates the command packet CP shown in FIG. 13 on the basis of the content of the change command and the identification-to-type correspondence table of the main communication terminal device.

In the "command" field $F_7$ of the command packet CP, a code corresponding to the command "GetNetConf" for requesting sending back of network settings at present is stored, and, in the "dstID" field $F_7$, the code "FF" representing all the sub communication terminal devices as receivers of the command packet CP is stored in order to broadcast the command packet CP.

In the "op" field $F_1$, the option code (i.e., "6" in FIG. 11) in the command packet CP for broadcasting is stored. In the "src type" field $F_3$ and the "srcID" field $F_5$, the code representing type $KD_{PC}$ of the main communication terminal device and the unique identifier $ID_{PC}$ of the main communication terminal device are stored, respectively.

The CPU 10 broadcasts the command packet CP through the communicating section 16. As a result, a request to send back the network settings at present is delivered to the sub communication terminal device (the hard disk video recorder 3 or the router 4) irrespective of the IP address assignment state.

In this state, the CPU 10 awaits, as a response to the command packet CP, the affirmative acknowledgement packet APA shown in FIG. 14 which is broadcast from the sub communication terminal device.

Figure 17:
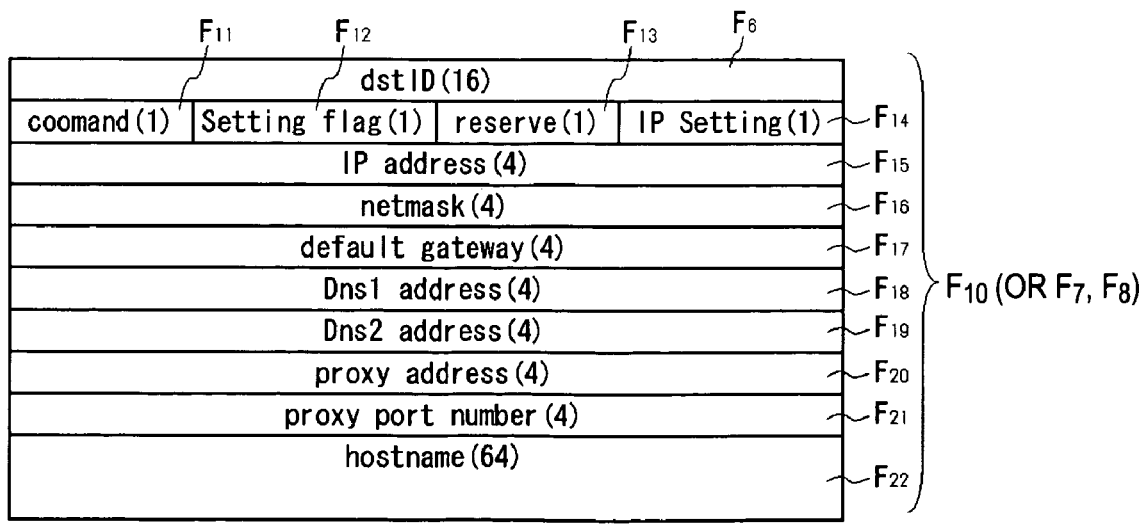
FIG. 17 is an illustration of examples of fields which are extended to an "extra" field (or a "cmd dependent" or "option" field)

As shown in FIG. 17, the "extra" field $F_{10}$ of the affirmative acknowledgement packet APA (FIG. 15) is formed by extending a 16-byte "dstID" field $F_6$, a 1-byte "Setting flag" field $F_{12}$ representing the network settings at present, a 1-byte "Reserve" field $F_{13}$, a 1-byte "IP Setting" field $F_{14}$, a 4-byte "IP address" field $F_{15}$, a 4-byte "netmask" field $F_{16}$, a 4-byte "default gateway" field $F_{17}$, a 4-byte "Dns1 address" field $F_{18}$, a 4-byte "Dns2 address" field $F_{19}$, a 4-byte "Proxy address" field $F_{20}$, a 4-byte "Proxy port number" field $F_{21}$, and a 64-byte "hostname" field $F_{22}$.

In the "Setting flag" field $F_{12}$, a flag indicating whether the network setting may be changed is stored. In the "reserve" field $F_{13}$, an item to be defined in future is stored. In the "IP Setting" field $F_{14}$, an IP setting code corresponding to one of DHCP&auto-IP, static ID, and auto-IP is stored.

In the "op" field $F_1$ in the command packet CP, the option code (i.e., "3" in FIG. 11) for broadcasting is stored.

After the CPU 10 receives the above affirmative acknowledgement packet APA through the communicating section 16, based on the character stored in the "xid" field $F_4$ of the affirmative acknowledgement packet APA, the CPU 10 determines whether the received affirmative acknowledgement packet APA responds to the command packet CP broadcast by the CPU 10.

If the received affirmative acknowledgement packet APA does not respond to the command packet CP broadcast by the CPU 10, it is indicated that, other than the main communication terminal device among the communication terminal devices connected to the LAN in the communication system 1, there is another main communication terminal device which transmits the command packet CP. In this case, the main communication terminal device serves as a sub communication terminal device to execute the updating process. This is described later.

If the affirmative acknowledgement packet APA responds to the command packet CP broadcast by the CPU 10, based on the type (KD) code in the "src type" field $F_3$ and the unique identifier ID in the "srcID" field $F_5$ in the affirmative acknowledgement packet APA, the CPU 10 determines whether the received affirmative acknowledgement packet APA has already been received.

In the case of the already received command packet CP, the CPU 10 discards the command packet CP. I the affirmative acknowledgement packet APA has not been received yet, the CPU 10 temporarily stores this packet in the storage memory 13.

Until eight seconds pass from the time the CPU 10 initially broadcasts the command packet CP, the CPU 10 re-broadcasts the command packet CP after one second, two seconds, and five seconds from the time (FIG. 12), and the CPU 10 awaits the affirmative acknowledgement packet APA from the sub communication terminal device.

Figure 18:
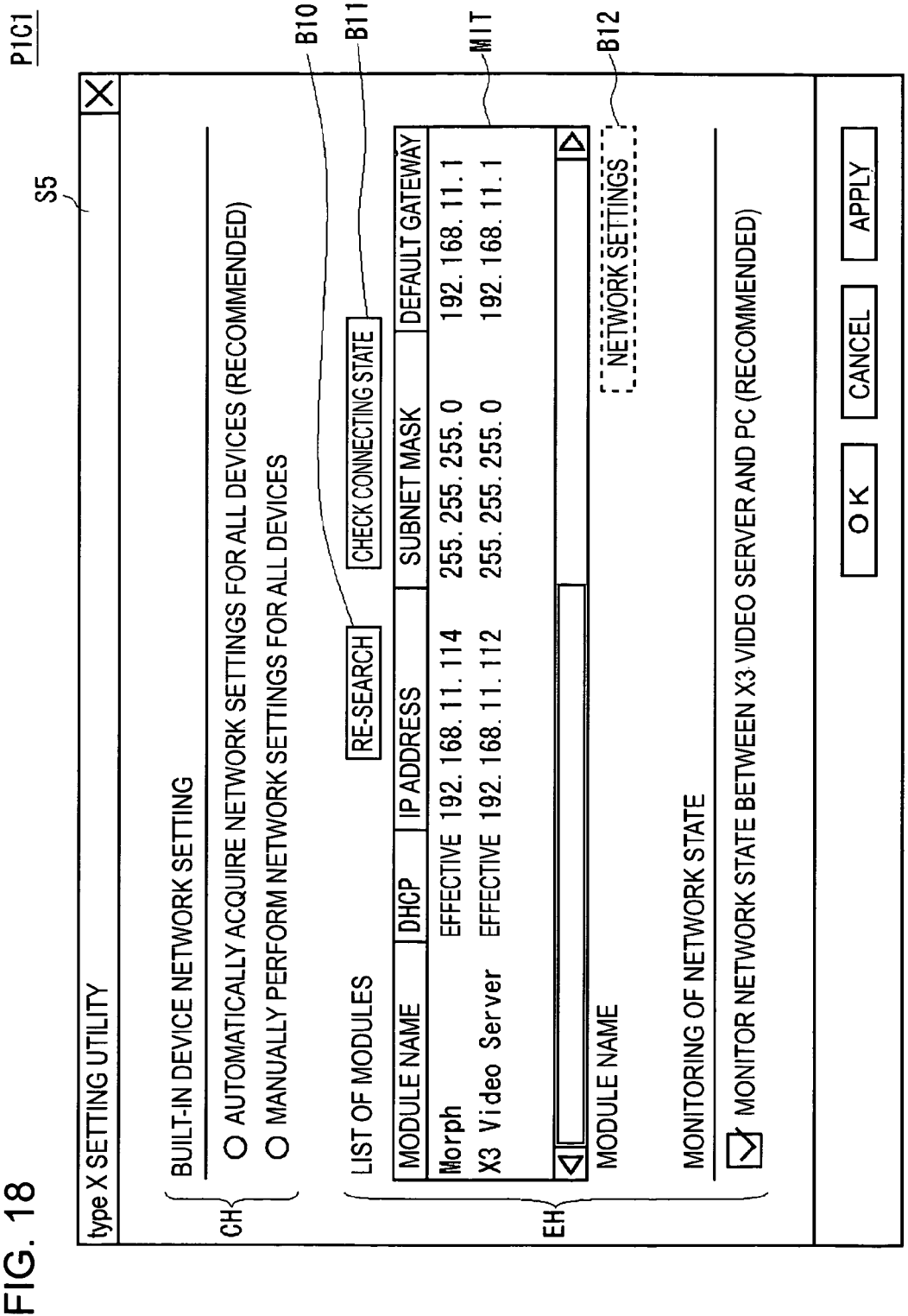
FIG. 18 is an illustration of an example of a network setting detail display screen.

After eight seconds pass from the initial broadcasting, the CPU 10 generates display screen data based on the temporarily stored affirmative acknowledgement packet APA, and displays, on the display section 15, the network-settings display screen PIC1, shown in FIG. 18, based on the display screen data. This notifies the user of the state of the network settings.

The network-settings display screen PIC1 includes a title portion such as "type X SETTING UTILITY", a selection portion CH for selecting which is to be used between manually setting and automatically setting the network for all the communication terminal devices on the LAN, a setting changing portion EH for performing network setting for each sub communication terminal device, and various buttons such as "OK", "CANCEL", and "APPLY".

The setting changing portion EH includes a "RE-SERACH" button B10 for re-requesting one sub communication terminal device on the LAN to send back of network settings at present, a "CHECK CONNECTING STATE" button for confirming the state of connection to the sub communication terminal device, items MIT of "LIST OF MODULES" indicating the network settings at present of the sub communication terminal device, and a "NETWORK SETTINGS" button B12 for changing the network settings of the sub communication terminal device which is indicated by the items MIT. The "NETWORK SETTINGS" button B12 can be selected, with the sub communication terminal device selected which is displayed by the items MIT of the "LIST OF MODULES".

As the items of the "LIST OF MODULES", specifically, a type KD is displayed as a common name based on the code in "src type" field $F_3$ of the affirmative acknowledgement packet APA, and "IP Setting", "IP address", "netmask", "default gateway", "Dns1 address", "Dns2 address", "Proxy address", "Proxy port number", and "hostname" in the fields $F_{12}$ to $F_{22}$ are displayed, if necessary. When a proper noun is stored in the "src type" field $F_3$, the proper noun is displayed as the type KD.

Figure 19:
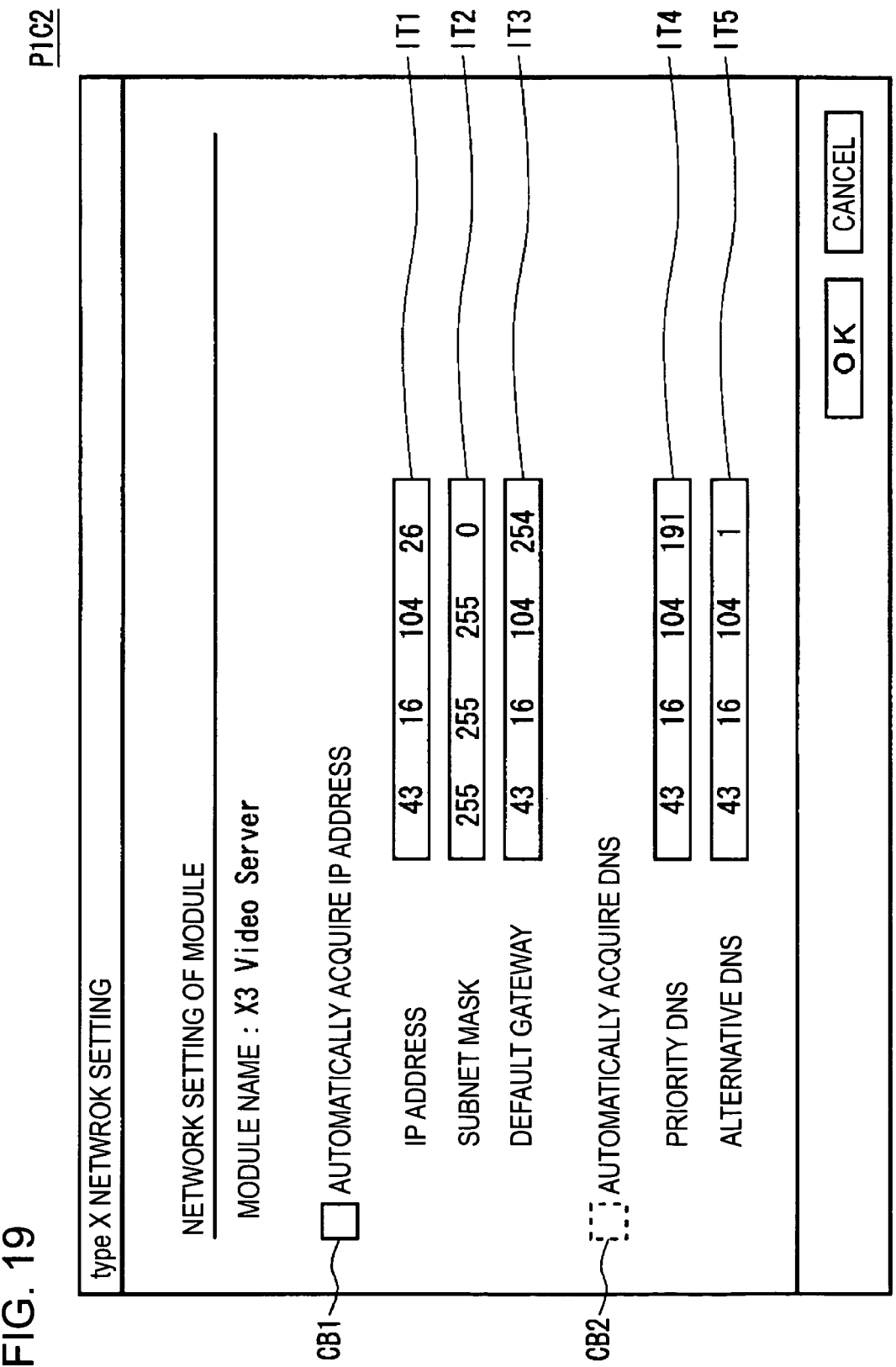
FIG. 19 is an illustration of an example of a setting-input screen.

When the "NETWORK SETTINGS" button B12 is selected, with, for example, the hard disk video recorder 3 ("X3 Video Server" in FIG. 18) selected as a sub communication terminal device in the items MIT of the "LIST OF MODULES", the CPU 10 generates setting-input-screen data based on the affirmative acknowledgement packet APA for the selected hard disk video recorder 3, and requests the user to change the network settings by displaying, on the display section 15, the setting-input screen PIC2, shown in FIG. 19, based on the setting-input-screen data.

The setting-input screen PIC2 includes a check box CH1 for selecting whether to automatically acquire an IP address, a check box CH2 for selecting whether to automatically acquire a domain name system (DNS), input items IT1 to IT5 for the IP address, a subnet mask, a default gateway, a priority DNS, and an alternative DNS, and "OK" and "CANCEL" buttons. The input items IT4 and IT5 can be selected, with the check box CH2 selected.

In the input items IT1 to IT5, the contents in the fields $F_{15}$ to $F_{19}$ for "IP address", "netmask", "default gateway", "Dns1 address", and "Dns2 address" of the affirmative acknowledgement packet APA for the hard disk video recorder 3 selected in the items MIT of the "LIST OF MODULES" are stored. This enables the user to use the operating section 14 of the personal computer 2 to change the network settings of the hard disk video recorder 3.

In this state, by selecting the "OK" button in the setting-input screen PIC2, the CPU 10 generates the command packet CP (in FIG. 13) based on the contents in the input items IT1 to IT5 and the identification-to-type correspondence table TB of the main communication terminal device.

The "cmd dependent" field $F_8$ and "option" field $F_9$ of the command packet CP are formed by extending the "extra" field Flo of the affirmative acknowledgement packet APA. Specifically, the "cmd dependent" field $F_8$ includes the "state flag" field $F_{12}$, the "reserve" field $F_{13}$, and the "IP Setting" field $F_{14}$. The "option" field $F_9$ is formed by extending the fields $F_{15}$ to $F_{22}$ for "IP address", "netmask", "default gateway", "Dns1 address", "Dns2 address", "Proxy address", "Proxy port number" and "hostname".

In addition, in the "command" field $F_7$, a code corresponding to the command "SetNetConf" for requesting change of the network setting at present is stored. In the "dstID" field $F_6$, the unique identifier ID (the unique identifier $ID_{HDR}$ of the hard disk video recorder 3) of the sub communication terminal device whose network setting is changed is stored.

In the "op" field $F_1$, the option code (i.e., "6" in FIG. 11) of the command packet CP for broadcasting is stored. In the "src type" field $F_3$ and "srcID" field $F_5$, the type (KD) code and unique identifier ID of the main communication terminal device are stored, respectively.

The CPU 10 broadcasts the above command packet CP through the communicating section 16. As a result, user-changed network settings of the personal computer 2 are delivered to a corresponding sub communication terminal device (the hard disk video recorder 3) irrespective of the IP address assignment state, and, in the sub communication terminal device, the network settings at present are changed to the changed network settings.

When the CPU 10 does not receive the affirmative acknowledgement packet APA for the command packet CP, the CPU 10 can re-broadcast the command packet CP, if necessary.

As described above, the main communication terminal device can change the network setting of a sub communication terminal device via the LAN, if necessary.

2-4-2. Responding Process of Sub Communication Terminal Device

In this case, when the CPU 10 in the sub communication terminal device (the hard disk video recorder 3 or the router 4) receives the command packet CP (FIG. 13), which includes the command "GetNetConf" for requesting network settings at present, the CPU 10 generates the affirmative acknowledgement packet APA (in FIG. 15) based on the network setting state at present in accordance with the received command, and broadcasts the generated affirmative acknowledgement packet APA.

In the "op" field $F_1$ of the affirmative acknowledgement packet APA, the option code (i.e., "7" in FIG. 11) of the affirmative acknowledgement packet for broadcasting is stored. In the "src type" field $F_3$ and "srcID" field $F_5$, the type (KD) code and unique identifier ID of the sub communication terminal device for broadcasting the affirmative acknowledgement packet APA are stored, respectively. In the "dstID"

field $F_6$, the unique identifier ID of the main communication terminal device is stored. In the "extra" field $F_{10}$, the network setting state at present is stored in the form of corresponding fields $F_{12}$ to $F_{22}$ shown in FIG. 17.

In addition, when the CPU 10 in the sub communication terminal device (the hard disk video recorder 3 or the router 4) receives the command packet CP (FIG. 13), which includes the command "SetNetConf" to request changing the network settings at present, the CPU 10 changes the network settings at present based on the received command packet CP.

Specifically, the network settings are changed to the changed network settings in the fields $F_{12}$ to $F_{22}$ (FIG. 17) for "Setting flag", "Reserve", "IP Setting", "IP address", "netmask", "default gateway", "Dns1 address", "Dns2 address", "Proxy address", "Proxy port number" and "hostname" in the "cmd dependent" field $F_8$ and "option" field $F_9$ of the command packet CP.

In this case, after changing the network setting state of the sub communication terminal device, by setting corresponding contents in the fields $F_1$ to $F_5$ without particularly setting any content in the "extra" field $F_{10}$, the CPU 10 can generate and broadcast the affirmative acknowledgement packet APA (FIG. 15).

As described above, the sub communication terminal device can notify the main communication terminal device of the network settings of the sub communication terminal device in response to a request from the main communication terminal device, or can change network settings of the sub communication terminal device as requested by the main communication terminal device.

3. Operation and Advantages by this Embodiment

In the above-described configuration, in the communication system 1, each communication terminal device stores, in the form of an identification-to-type correspondence table TB, correspondence between a unique identifier ID different from an IP address in a layer higher than a layer in which the IP address is generated, and a communication terminal device type KD.

In the communication system 1, a communication terminal device servers as an origin with predetermined timing to transmit (broadcast) the unique identifier ID and type KD of the communication terminal device to unspecified destinations, and updates an identification-to-type correspondence table TB on the basis of the unique identifier ID and type KD of one communication party which are send back as a response from one communication party.

Therefore, in the communication system 1, by using, as a trigger, a change in state of a communication terminal device, such as power supply (activation), a return from a standby state (power saving mode), or connection to the LAN, the communication terminal device servers as an origin, whereby the communication terminal device can communicate with the communication party irrespective of an IP address assignment state. Thus, even if the IP address dynamically changes, a period up to establishment of communication can be prevented from being prolonged, and a situation of communication with a communication party other than an originally desired communication party can be prevented from occurring. In addition, false communication in an originally main IP communication mode can be considerably reduced.

In this case, in the communication system 1, by using, as a trigger, the time that a communication terminal device detects a change in its state such as power supply (activation), a return from a standby state (power saving mode), or connection to the LAN, the communication terminal device serves as an origin, whereby, even if communication terminal devices are connected via a wireless LAN whose topology frequently changes, prolongation of establishment of communication can be prevented and false communication can be prevented.

In the communication system 1, the personal computer 2 which detects a request to collect network setting of a communication party, broadcasts, as the command packet CP (FIG. 13), a request to report network setting of a communication party (the hard disk video recorder 3 or the router 4) registered in the identification-to-type correspondence table TB, and displays on the display section 15, network setting which are sent back as a response from the communication party.

Therefore, since, in the communication system 1, network setting in a communication party can be confirmed via the LAN without being directly operated, even in a state in which the IP address dynamically changes, the changing state can be easily confirmed.

When, in the communication system 11, a change in network settings displayed on the display section 15 is detected, a communication party corresponding to the change is specified based on the identification-to-type correspondence table TB, the unique identifier ID and type KD of the specified communication party, and a network-setting change request are broadcast as the command packet CP (FIG. 13).

Accordingly, in the communication system 1, network settings of a communication party can be changed via the LAN without being directly changed. Thus, network setting of a new communication party connected to the network can be easily established, and, even in a state in which an IP address dynamically changes, the change can be corrected.

According to the above-described configuration, a communication terminal device serves as an origin with predetermined timing and broadcasts the unique identifier ID and type KD of the communication terminal device to a communication party connected to the LAN, and updates the identification-to-type correspondence table TB based on the unique identifier ID and type KD of the communication party which are sent back as a response from the communication party, whereby the communication terminal device can communicate with the communication party on the basis of the identification-to-type correspondence table TB irrespective of the IP address assignment state. Thus, even if the IP address dynamically changes, a period up to establishment of communication can be prevented from being prolonged, and a situation of communication with a communication terminal device as an originally desired communication party can be prevented from occurring. Therefore, effectiveness of communication control can be easily improved.

4. Other Embodiments

In the above-described embodiment, a case in which a communication terminal device that detects a change in its state serves as an origin to initiate the updating process has been described. The present invention is not limited to this embodiment the communication terminal device may serve as an origin to initiate the updating process with timing of various types such as the time that the communication terminal device receives, from the operating section 14, an instruction to update the identification-to-type correspondence table TB, each predetermined period, and a combination of these.

In the above-described embodiment, a case has been described in which an identification information generating means (the CPU 10 (the communication control section CC)) that generates second identification information different from first identification information on the basis of information unique to a communication terminal device generates a unique identifier ID different from an IP address on the basis of an MAC address. However, the present invention is not limited to this case, and a manufacture's serial number of the communication terminal device may be directly used as an initial unique identifier ID.

In the above-described embodiment, a case has been described in which the main communication terminal device initiates the network-setting changing process when detecting, from the user interface YI2, a request to collect network setting. However, the present invention is not limited to this case, and the main communication terminal device may initiate the network-setting changing process when receiving a network-setting collecting request transmitted from the sub communication terminal device.

In this case, regarding timing with which, for example, the sub communication terminal device transmits the network-setting collecting request to the main communication terminal device, for example, the time that the unique identifier ID stored in the "dstID" field $F_6$ of the received command packet does not coincide with the unique identifier ID of the sub communication terminal device registered in the identification-to-type correspondence table TB, or the time that the sub communication terminal device detects a change in its state may be employed. In addition, regarding transmission to the main communication terminal device, a technique in which the network-setting collecting request is stored in the "reason" field $F_1 1$ of the acknowledgement packet for the command packet and the acknowledgement packet is unicast, or a technique in which the sub communication terminal device unicasts the network-setting collecting request as a command packet may be employed.

This can ensure that false communication in an originally main IP communication can be prevented.

In the above-described embodiment, a case in which the personal computer 2, the hard disk video recorder 3, and the router 4 are connected by a LAN to form the communication system 1 has been described. However, the present invention is not limited to this case. For example, communication terminal devices, such as cellular phones, personal digital assistants (PDAs), household electronic devices having communication functions, and other types of communication terminal devices, may be connected to one another by networks such as IEEE (Institute of Electrical and Electronics Engineers) 1394 and other types of networks.

It should be understood by those skilled in the art that various modifications, combinations, sub-combinations and alterations may occur depending on design requirements and other factors insofar as they are within the scope of the appended claims or the equivalents thereof.

What is claimed is:

1. A communication terminal device for performing communication based on a communication protocol defined so that first identification information assigned to the communication terminal device is transmitted to and received from a plurality of communication parties, the communication terminal device comprising:

identification information generating means which, based on information unique to the communication terminal device, generates second identification information different from the first identification information;

storage means which stores a table containing data linking the second identification information generated by said identification information generating means with a type identifier of the communication terminal device, and for storing data linking device identification information with type identifiers received from the plurality of communication parties;

control means which controls said storage means so that communication with the plurality of communication parties is established based on the table, wherein said control means broadcasts the second identification information and type of the communication terminal device to the plurality of communication parties, and updates the table based on device identification information and a type identifier corresponding to each of the plurality of communication parties which are sent back as a response to the broadcast, the control means rebroadcasting the second identification information and the type of the communication terminal device according to a count value controlled by a clock of the device until the count value exceeds a predetermined threshold; and detection means for detecting an operating instruction supplied from an external network or a user interface, wherein the communication terminal device, upon detecting the operating instruction, generates and broadcasts a command corresponding to the operating instruction, along with the device identification information and the type identifier, to the plurality of communication parties to determine a communication party that matches the device identification information and the type identifier, the communication party that matches the device identification information executing processing according to the operating instruction.

2. The communication terminal device according to claim 1, wherein said control means transmits the second identification information and type of the communication terminal device to the plurality of communication parties in response to a change in the state of the communication terminal device.

3. The communication terminal device according to claim 1, wherein, when said control means detects a request to collect network settings, said control means transmits, to the the plurality of communication parties, a request to report the network settings of each of the plurality of communication parties, together with the second identification information of the communication terminal device, and reports network settings of the plurality of communication parties which are sent back as a response to the request in a form in which the network settings, device identification information, and the type identifier of one of the plurality of communication parties are mutually associated.

4. The communication terminal device according to claim 2, wherein, when the reported network settings are changed, said control means specifies, based on the table, the device identification information and type identifier of one of the plurality of communication parties which correspond to the changed network settings, and transmits, to the plurality of communication parties, the specified device identification information and type identifier and the changed network settings.

5. A communication method for performing communication based on a communication protocol defined so that first identification information assigned to a communication terminal device is transmitted to and received from a plurality of communication parties, the communication method comprising the steps of:

based on information unique to the communication terminal device, generating second identification information of corresponding to the communication terminal device which is different from the first identification information;

storing a table containing data linking the generated second identification information with a type identifier of the communication terminal device, and storing data linking device identification information with type identifiers received from the plurality of communication parties;

transmitting the second identification information and type of the communication terminal device to the plurality of communication parties and updating the table based on device identification information and a type identifier corresponding to each of the plurality of communication parties which are sent back as a response to the transmission;

rebroadcasting the second identification information and the type of the communication terminal device according to a count value controlled by a clock until the count value exceeds a predetermined threshold; and detecting an operating instruction supplied from an external network or a user interface, wherein the communication terminal device, upon detecting the operating instruction, generates and broadcasts a command corresponding to the operating instruction, along with the device identification information and the type identifier, to the plurality of communication parties to determine a communication party that matches the device identification information and the type identifier, the communication party that matches the device identification information executing processing according to the operating instruction.

6. The communication method according to claim 5, wherein:

the transmitting step includes the step of detecting a change in the state of the communication terminal device; and in response to the detected change in the state of the communication terminal device, the second identification information and type of the communication terminal device are transmitted to the plurality of communication parties.

7. The communication method according to claim 5, wherein:

the transmitting step includes the step of detecting a collecting request to collect network settings; and in response to the detected collecting request, a request to report the network settings is transmitted with the second identification of the communication terminal device, and network settings of the plurality of communication parties are sent back as a response to the request, the response to the request including device identification information and a type identifier of one of the plurality of communication parties are reported to the communication terminal device and are mutually associated.

8. The communication method according to claim 7, further comprising the step of, when the network settings reported in the transmitting step are changed, specifying, based on the table, the device identification information and type identifier of one of the plurality of communication parties which correspond to the changed network settings, and transmitting, to the plurality of communication parties, as a network-setting changing request, the specified device identification information and type identifier and the changed network settings.

9. A communication terminal device for performing communication based on a communication protocol defined so that first identification information assigned to the communication terminal device is transmitted to and received from a plurality of communication parties, the communication terminal device comprising:

an identification information generating section detecting, based on information unique to the communication terminal device, second identification information different from the first identification information;

a storage section storing a table containing data linking the second identification information generated by said identification information generating section with a type identifier of the communication terminal device, and for storing data linking device identification information with type identifiers received from the plurality of communication parties; and a control section controlling said storage section so that communication with the plurality of communication parties is established based on the table, wherein said control section broadcasts the second identification information and type of the communication terminal device to the plurality of communication parties, and updates the table based on device identification information and a type identifier corresponding to each of the plurality of communication parties which are sent back as a response to the broadcast, the control section rebroadcasting the second identification information and the type of the communication terminal device according to a count value controlled by a clock section of the device until the count value exceeds a predetermined threshold; and detection means for detecting an operating instruction supplied from an external network or a user interface, wherein the communication terminal device, upon detecting the operating instruction, generates and broadcasts a command corresponding to the operating instruction, along with the device identification information and the type identifier, to the plurality of communication parties to determine a communication party that matches the device identification information and the type identifier, the communication party that matches the device identification information executing processing according to the operating instruction.

* * * * *